United States Patent
Kim et al.

(10) Patent No.: US 9,788,261 B2
(45) Date of Patent: Oct. 10, 2017

(54) METHOD AND APPARATUS FOR TRANSMITTING AND RECEIVING A SIGNAL IN A WIRELESS COMMUNICATION SYSTEM TO REDUCE INTER-CELL INTERFERENCE

(75) Inventors: Han-Ju Kim, Seoul (KR); Hyuk-Joon Kwon, San Diego, CA (US); Chae-Man Lim, Seoul (KR); Jung-Won Lee, San Diego, CA (US); In-Yup Kang, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 13/543,177

(22) Filed: Jul. 6, 2012

(65) Prior Publication Data

US 2013/0331138 A1 Dec. 12, 2013

(30) Foreign Application Priority Data

Jun. 9, 2012 (KR) .................. 10-2012-0061850

(51) Int. Cl.
*H04B 7/00* (2006.01)
*H04W 48/12* (2009.01)
(Continued)

(52) U.S. Cl.
CPC ............. *H04W 48/12* (2013.01); *H04L 5/005* (2013.01); *H04L 5/0035* (2013.01); *H04L 5/0073* (2013.01); *H04W 72/00* (2013.01)

(58) Field of Classification Search
CPC ... H04W 72/044; H04W 24/02; H04W 36/30; H04W 72/082; G01S 5/10; H04L 1/0025;
(Continued)

(56) References Cited

U.S. PATENT DOCUMENTS

2004/0131029 A1* 7/2004 Tobe et al. .................. 370/331
2011/0230144 A1   9/2011 Siomina et al.
(Continued)

FOREIGN PATENT DOCUMENTS

| CN | 102340344 A | 2/2012 |
|---|---|---|
| CN | 102388542 A | 3/2012 |

(Continued)

OTHER PUBLICATIONS

Nokia Siemens Networks, et al., "Remaining issues for signalling support for CRS IC", 3GPP TSG RAN1 Meeting #69, R1-122404, May 21-25, 2012.

(Continued)

*Primary Examiner* — Shaima Q Aminzay
(74) *Attorney, Agent, or Firm* — Jefferson IP Law, LLP

(57) ABSTRACT

Methods, a Base Station (BS), and a User Equipment (UE) in a wireless communication system for transmitting and receiving a signal are provided. The method for transmitting a signal by a first BS in a wireless communication system includes receiving control information including information related to transmission of a Reference Signal (RS) by one or more second BSs, from the one or more second BSs which are neighboring BSs of the first BS, and transmitting signals to a UE based on information as to a second resource identified in the received control information, wherein the second resource corresponds to an identical resource to that used by the one or more second BSs for transmitting the RS.

18 Claims, 9 Drawing Sheets

(51) Int. Cl.
*H04L 5/00* (2006.01)
*H04W 72/00* (2009.01)

(58) Field of Classification Search
CPC ............... H04L 1/0031; H04L 1/1893; H04L 25/03955; H04B 1/7117; H04B 2201/70701; H04B 2201/70702; H04B 7/0408; H04B 7/0417
USPC ............ 455/509, 41.2, 13.4, 522, 574, 403, 455/412.2, 436, 455, 456.5, 41.1; 370/208, 329, 331, 336
See application file for complete search history.

(56) References Cited

U.S. PATENT DOCUMENTS

| 2012/0002596 A1 | 1/2012 | Kim et al. | |
| 2012/0033571 A1* | 2/2012 | Shimezawa et al. | 370/252 |
| 2013/0172003 A1 | 7/2013 | Chun et al. | |
| 2014/0016597 A1* | 1/2014 | Zhang | 370/329 |

FOREIGN PATENT DOCUMENTS

| RU | 2417531 C2 | 4/2011 |
| WO | 2011-034966 A1 | 3/2011 |
| WO | 2011 115546 A1 | 9/2011 |
| WO | 2011-118993 A2 | 9/2011 |
| WO | 2012-036492 A2 | 3/2012 |

OTHER PUBLICATIONS

Alcatel-Lucent Shanghai Bell, et al., "Discussion for CRS Related Functionalities under CRS Collision", 3GPP TSG RAN1 Meeting #69, R1-122476, May 21-25, 2012.
LG Electronics, "Signaling support for CRS interference handling", 3GPP TSG RAN1 Meeting #69, R1-122284, May 21-25, 2012.
Alcatel-Lucent, et al., "CRS Collisions with PDSCH for Downlink CoMP", 3GPP TSG RAN1 Meeting #69, R1-122486, May 21-25, 2012.
Samsung, "Discussion on CRS-based CoMP", 3GPP TSG RAN1 Meeting #69, R1-122232, May 21-25, 2012.
QUALCOMM Incorporated, Need for transmitter based solutions, 3GPP TSG-RAN WG1 #69, R1-122775, XP050600953, May 12, 2012, Prague, Czech Republic.
Intel Corporation (UK) Ltd, Signalling and power utilization considerations for PDSCH muting, 3GPP TSG-RAN WG1 #62, R1-104376, XP050449727, Aug. 17, 2010, Madrid, Spain.
ETRI, PDSCH RE mapping indication for multi-cell JP CoMP, 3GPP TSG-RAN WG1 #69, R1-122624, XP050600810, May 12, 2012, Prague, Czech Republic.
Marvell, "DM-RS design considerations for CoMP", 3GPP TSG-RAN WG1 #68, R1-120391, Feb. 6-10, 2012, Dresden, Germany.

* cited by examiner

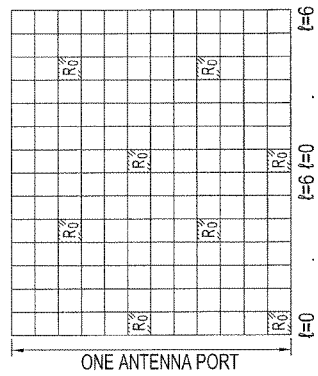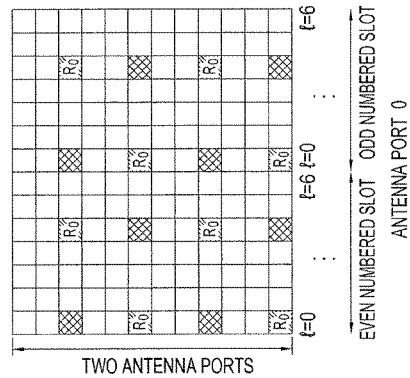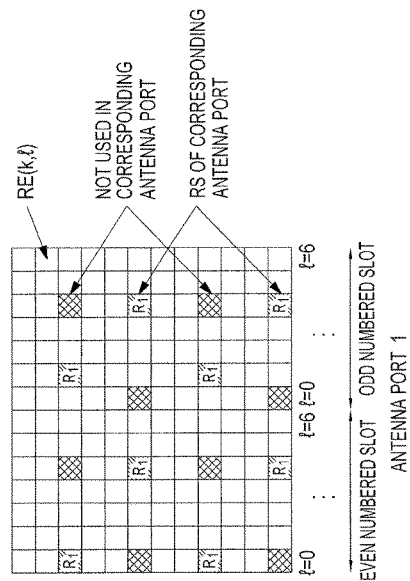
FIG.1A
FIG.1B

METHOD AND APPARATUS FOR TRANSMITTING AND RECEIVING A SIGNAL IN A WIRELESS COMMUNICATION SYSTEM TO REDUCE INTER-CELL INTERFERENCE

PRIORITY

This application claims the benefit under 35 U.S.C. §119(a) of a Korean patent application filed in the Korean Intellectual Property Office on Jun. 9, 2012 and assigned Serial No. 10-2012-0061850, the entire disclosure of which is hereby incorporated by reference.

BACKGROUND OF THE INVENTION

1. Field of the Invention

The present invention relates to a method and an apparatus for a wireless communication system. More particularly, the present invention relates to a method and an apparatus for transmitting and receiving a signal in a wireless communication system.

2. Description of the Related Art

A cell radius is very small in a next generation wireless communication system, compared to an existing cellular environment. Also, the cell distribution is irregular according to the operation of various cells, such as a femto cell. Inter-cell interference in such an environment is a major reason of degrading a performance of a User Equipment (UE) according to a packet error of the UE.

In order to address an interference problem in a wireless communication system, it is desirable to accurately estimate an interference signal and channel information on the interference signal. To this end, a Reference Signal (RS) is transmitted on a Orthogonal Frequency Division Multiplexing (OFDM) domain in a wireless communication system (e.g. a Long Term Evolution (LTE) system).

An example of the RS includes a Cell-specific Reference Signal (CRS). The CRS, which is a generally used RS, is transmitted to every UE within each cell. The CRS is transmitted via each antenna in a form of a pseudo random sequence initiated with a cell IDentifier (ID) in order to minimize inter-cell interference. Accordingly, position information on the CRS may be detected based on the cell ID, and a position of a CRS transmission frequency for each antenna is determined within the same symbol according to the number of transmission antennas.

In the meantime, a wireless communication system of the related art using the CRS has a number of shortcomings. For example, in the wireless communication system using the CRS, when a resource used for transmitting the CRS in a first cell among a plurality of cells is the same as that used for transmitting the CRS in a second cell which is a neighboring cell of the first cell, inter-cell interference is generated and exerts influence on the first cell and the second cell. Accordingly, when the UEs located in the respective first and second cells estimate a channel based on the CRS within the corresponding cell, it is desirable to prevent a channel estimation performance from being degraded by removing the interference from the received CRS or compensating for the interference.

Accordingly, in the wireless communication system of the related art, the UE performs an additional operation in order to address the interference problem according to the CRS transmission, so that the complexity according to signal transmission/reception increases and a load of the UE increases.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting and receiving a signal in a wireless communication system.

Another aspect of the present invention is to provide a method and an apparatus for transmitting and receiving a Reference Signal (RS) such that inter-cell interference is not generated in a wireless communication system.

Another aspect of the present invention is to provide a method and an apparatus for improving a channel estimation performance of a User Equipment (UE) and reducing the complexity according to signal transmission/reception.

In accordance with an aspect of the present invention, a method for transmitting a signal by a first Base Station (BS) in a wireless communication system is provided. The method includes receiving control information including information related to transmission of a RS by one or more second BSs from the one or more second BSs which are neighboring BSs of the first BS, and transmitting signals to a UE based on information as to a second resource identified in the received control information, wherein the second resource corresponds to an identical resource to that used by the one or more second BSs for transmitting the RS.

In accordance with another aspect of the present invention, a BS in a wireless communication system for transmitting a signal is provided. The BS includes a BS interface unit, a transmitter, and a controller. The BS interface unit is for receiving control information including information related to transmission of a RS by one or more second BSs, from the one or more second BSs which are neighboring BSs of the first BS. The transmitter is for transmitting signals to a UE. The controller is for controlling the BS interface and the transmitter, and for controlling to transmit the signals to the UE based on information as to a second resource identified in the received control information. The second resource corresponds to an identical resource to that used by the one or more second BSs for transmitting the RS.

In accordance with yet another aspect of the present invention, a method for receiving a signal by a UE in a wireless communication system is provided. The method includes receiving control information including information related to transmission of a RS by a serving BS and one or more neighboring BSs, determining whether a first resource used by the serving BS to transmit the RS is the same as a second resource used by the one or more neighboring BSs to transmit the RS, when the first resource is the same as the second resource, estimating a channel using an interference removal scheme, and when the first resource is not the same as the second resource, estimating a channel based on an RS received from the serving BS and receiving data from the serving BS while ignoring data corresponding to the second resource.

In accordance with still another aspect of the present invention, a UE in a wireless communication system for receiving a signal is provided. The UE includes a receiver and a controller. The receiver receives control information including information related to transmission of a RS by a serving BS and one or more neighboring BSs. The controller is for controlling the receiver, determining whether a first resource used by the serving BS to transmit the RS is the same as a second resource used by the one or more neighboring BSs to transmit the RS, when the first resource is the same as the second resource, estimating a channel using an interference removal scheme, and when the first resource is not the same as the second resource, estimating a channel based on an RS received from the serving BS and controlling to receive data from the serving BS while ignoring data corresponding to the second resource.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 1A to 1B are diagrams illustrating an example of a CRS used in a wireless communication system according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 2:
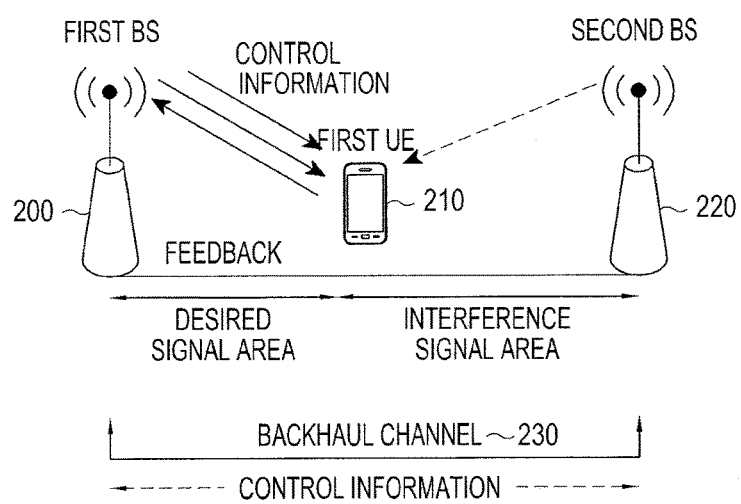
FIG. 2 is a diagram illustrating a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for transmitting/receiving a signal in a wireless communication system. More particularly, exemplary embodiments of the present invention provide a method and an apparatus for preventing interference according to transmission of a Reference Signal (RS) from being generated by transmitting the RS by using different resources in respective cells. Hereinafter, a case in which the RS is a Cell-specific Reference Signal (CRS) will be described as an example in an exemplary embodiment of the present invention.

In the meantime, an example of the wireless communication system according to the exemplary embodiment of the present invention includes a wireless communication system, such as Global System for Mobile communications (GSM), a Wideband Code Division Multiple Access (WCDMA) system, Universal Mobile Telecommunications System (UMTS), and a Long Term Evolution (LTE) system, requiring an interference control. However, a case in which the wireless communication system is the LTE system will be described as an example in the following description for convenience in description.

In general, a channel estimation for an interference signal is performed in order to use an interference recognition communication (i.e., interference aware cancellation) scheme. The channel estimation for the interference signal may be performed based on a CRS, etc. of an interference cell. Hereinafter, the CRS will be described with reference to FIGS. 1A and 1B.

FIGS. 1A and 1B are diagrams illustrating an example of a CRS used in the wireless communication system according to an exemplary embodiment of the present invention.

The CRS is generally transmitted to every UE located within each cell. The CRS is transmitted in a form of a pseudo random sequence initiated with a cell IDentifier (ID) in order to minimize inter-cell interference. Accordingly, position information on the CRS may be detected based on the cell ID.

When the number of transmission antennas is one, the CRS is mapped to a Resource Block (RB) as illustrated in FIG. 1A. A form of the mapping of the CRS to the RB corresponds to a pseudo random sequence initiated with a cell ID, and corresponds to a form of Resource Elements (REs) including "R0" as shown in FIG. 1A.

In the meantime, when the number of transmission antennas is two, the CRS is mapped to a RB for each transmission antenna as illustrated in FIG. 1B. The CRS for each transmission antenna is transmitted in the same symbol. However, the CRS for each transmission antenna in a corresponding symbol in which the CRS is transmitted, is transmitted using different frequency resources.

For example, as illustrated in FIG. 1B, when a CRS (i.e., a first CRS) corresponding to a first antenna (i.e., antenna port 0) is mapped to REs indicated with "R0" and a CRS (i.e., a second CRS) corresponding to a second antenna (i.e., antenna port 1) is mapped to REs indicated with "R1", the first CRS and the second CRS are transmitted in the same symbol (i.e., a 0th symbol and a 4th symbol). However, in the respective 0th and 4th symbols, the second CRS is not transmitted in a frequency band in which the first CRS is transmitted, and the first CRS is not transmitted in a frequency band in which the second CRS is transmitted. That is, the first CRS and the second CRS are transmitted using different frequency resources.

In the meantime, the UE estimates a channel value for a signal transmitted for each subcarrier for decoding a signal of a serving cell from which the UE currently receives a service. An apparatus for performing the channel estimation is generally referred to as a channel estimator. The channel estimator estimates a channel value of the RS by using information on a cell ID and the RS, and estimates channel values of the remaining subcarriers based on the estimated channel value of the RS. When the channel value for each subcarrier is estimated by the channel estimator, the UE detects a reception signal based on the estimated channel value and decodes the reception signal. Accordingly, it is determined that the performance of the channel estimator for the signal of the serving cell exerts the largest influence on performance of a receiver according to a packet error.

In order to perform interference recognition communication (e.g., communication of estimating and removing an interference signal from a reception signal), a channel estimation for an interference signal by using a CRS of an interference cell is performed. In this case, when a resource used for transmitting the CRS by the interference cell is the same as that used for transmitting the CRS by the serving cell, the influence of the interference between the serving cell and the interference cell increases, thereby causing a problem of degrading a channel estimation performance in each cell.

In order to address the degradation of the channel estimation performance, a channel estimation method of removing interference between the serving cell and the interference cell or performing a compensation according to the interference based on a characteristic of the CRS, which is that pseudo random sequences for respective cell IDs are orthogonal to each other. However, such a channel estimation method is required to be repeated or its complexity is very high.

In order to address the aforementioned problem, the exemplary embodiments of the present invention provide a new method for transmitting/receiving a CRS. Prior to describing the method, the wireless communication system according to the exemplary embodiment of the present invention will be described with reference to FIG. 2.

FIG. 2 is a diagram illustrating a wireless communication system according to an exemplary embodiment of the present invention.

Referring to FIG. 2, the wireless communication system includes a first BS 200, a first UE 210 receiving a signal from the first BS 200, a second BS 220 that is a neighboring BS of the first BS 200, and a second UE (not shown) receiving a signal from the second BS 220.

The first BS 200 and the second BS 220 represent transmitters used in the general wireless communication system. For example, when the wireless communication system is the LTE system, each of the first BS 200 and the second BS 220 may be an evolved Node B (eNodeB), and when the wireless communication system is the UMTS (or WCDMA) system, each of the first BS 200 and the second BS 220 may be a Node B (NodeB). Further, when the wireless communication system uses a signaling for conforming to a communication standard, each of the first BS 200 and the second BS 220 may be a BS having a broad meaning including an Evolved Packet Core (EPC) or a Radio Network Controller (RNC).

Further, a backhaul channel 230 in FIG. 2 is a simplification of various network constructions for connecting the respective BSs in a wireless communication network, and indicates a transmission channel for signaling and exchanging data between different BSs in the present exemplary embodiment of the present invention. The first BS 200 and the second BS 220 may exchange control information including transmission information on signals within their cells through the backhaul channel 230. Accordingly, the first BS 200 and the second BS 220 transmit the signals with reference to the received signal transmission information on the respective neighboring BSs, thereby preventing the generation of the inter-cell interference and addressing a problem of the degradation of the channel estimation performance of the first UE 210 and the second UE.

In the meantime, FIG. 2 has been described based on contents of a case in which the first BS 200 exchanges control information with one BS (i.e., the second BS 220), but the first BS 200 may exchange the control information with a plurality of neighboring BSs.

Figure 3:
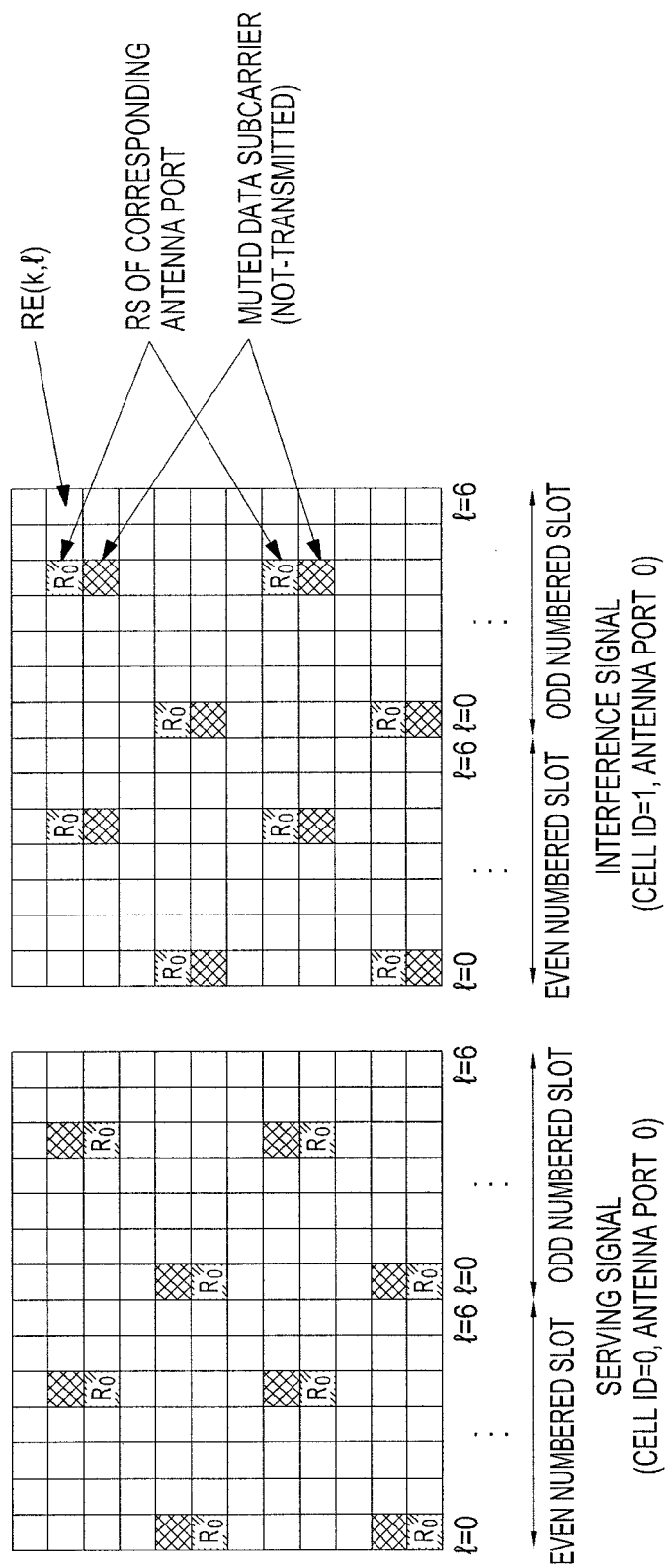
FIG. 3 is a diagram illustrating an example of mapping of a Cell-specific Reference Signal (CRS) to a Resource Block (RB) according to an exemplary embodiment of the present invention.

The first BS 200 and the second BS 220 may transmit the CRS through a process of mapping the CRS to the RB illustrated in FIG. 3.

FIG. 3 is a diagram illustrating an example of mapping of a CRS to an RB according to an exemplary embodiment of the present invention.

Referring to FIG. 3, when the first BS 200 and the second BS 200 have one transmission antenna, respectively, an ID of a cell (hereinafter, referred to as a "serving cell") managed by the first BS 200 is "0", and an ID of a cell (hereinafter, referred to as an "interference cell") managed by the second BS 220 is "1", the CRS of the serving cell is mapped to the same resource (i.e., the Resource Element (RE)) as that of data of the interference cell.

When the CRS of the serving cell is mapped to the same RE as that of the data of the interference cell, the first BS 200 may transmit the CRS by using the corresponding RE. However, when the first UE 210 of the serving cell estimates the channel by using the transmitted CRS, the data of the interference cell, as well as the CRS of the serving cell, is received, so that the performance of the channel estimation is inevitably degraded.

Accordingly, the degradation of the channel estimation performance may be prevented by generating and removing the data of the interference cell by the first UE 210. However, when the first UE 210 performs the operation of the generation and the removal of the data of the interference cell, the complexity of the UE is disadvantageously increased.

Accordingly, as illustrated in FIG. 3, according to the present exemplary embodiment of the present invention, the interference cell is prevented from using the same RE as that used for transmitting the CRS by the serving cell and the serving cell is prevented from using the same RE as that used for transmitting the CRS by the interference cell, so that the interference problem according to the transmission of the CRS in the respective cells may be addressed.

Hereinafter, the operation of the first BS 200 and the first UE 210 according to the present exemplary embodiment of the present invention will be described. For convenience in explanation, the first BS 200 is indicated as a serving BS and the first UE 210 is indicated as a serving cell UE.

First, the operation of the serving BS will be described with reference to FIGS. 4 to 7. The operation of the serving BS may be described with four exemplary embodiments as illustrated in FIGS. 4 to 7.

Figure 4:
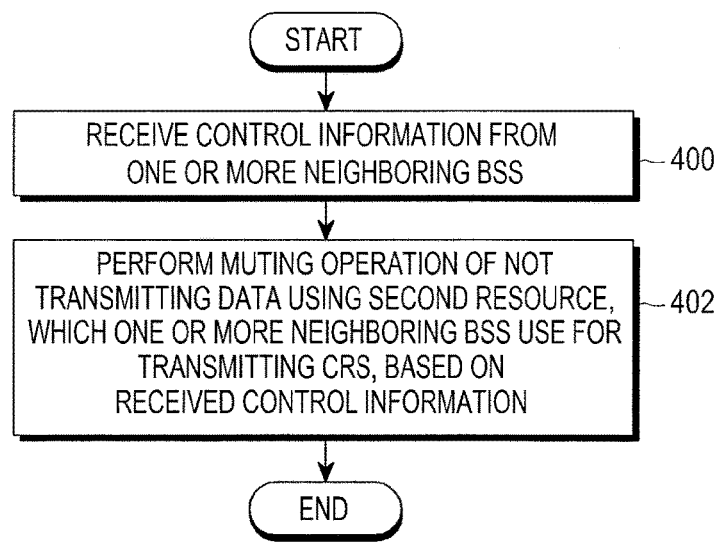
FIG. 4 is a flowchart illustrating a process of transmitting a CRS by a serving Base Station (BS) according to a first exemplary embodiment of the present invention.

FIG. 4 is a flowchart illustrating a process of transmitting a CRS by a serving BS according to a first exemplary embodiment of the present invention.

Referring to FIG. 4, the serving BS receives control information from one or more neighboring BSs in step 400. The control information includes signal transmission information and resource allocation information on the one or more neighboring BSs. Further, the control information may be received in various methods, such as being received according to a request of the serving BS or being periodically received.

The serving BS performs a muting operation of not transmitting data using a second resource, which the one or more neighboring BSs use for transmitting the CRS, based on the received control information in step 402. The muting operation may include an operation of ignoring a signal to be transmitted to a corresponding position and not transmitting the signal. Alternatively, the muting operation may include not assigning transmission data to resources corresponding to resources in which one or more neighboring BSs transmit the CRS. When the serving BS performs the muting operation, the serving BS does not transmit data during the transmission of the CRS by the one or more neighboring BSs, so that interference according to the data transmission by the serving BS is not generated in cells of the one or more neighboring BSs during the transmission of the CRS.

In the meantime, a cell radius is very small, compared to an existing cellular environment, and a plurality of various cells, such as a femto cell, is operated in the wireless communication system, so that a case in which the respective cells use the same resource for transmitting the CRS between the cells may be generated. In order to address the aforementioned problem, the serving BS may perform a process according to a second exemplary embodiment of the present invention illustrated in FIG. 5.

Figure 5:
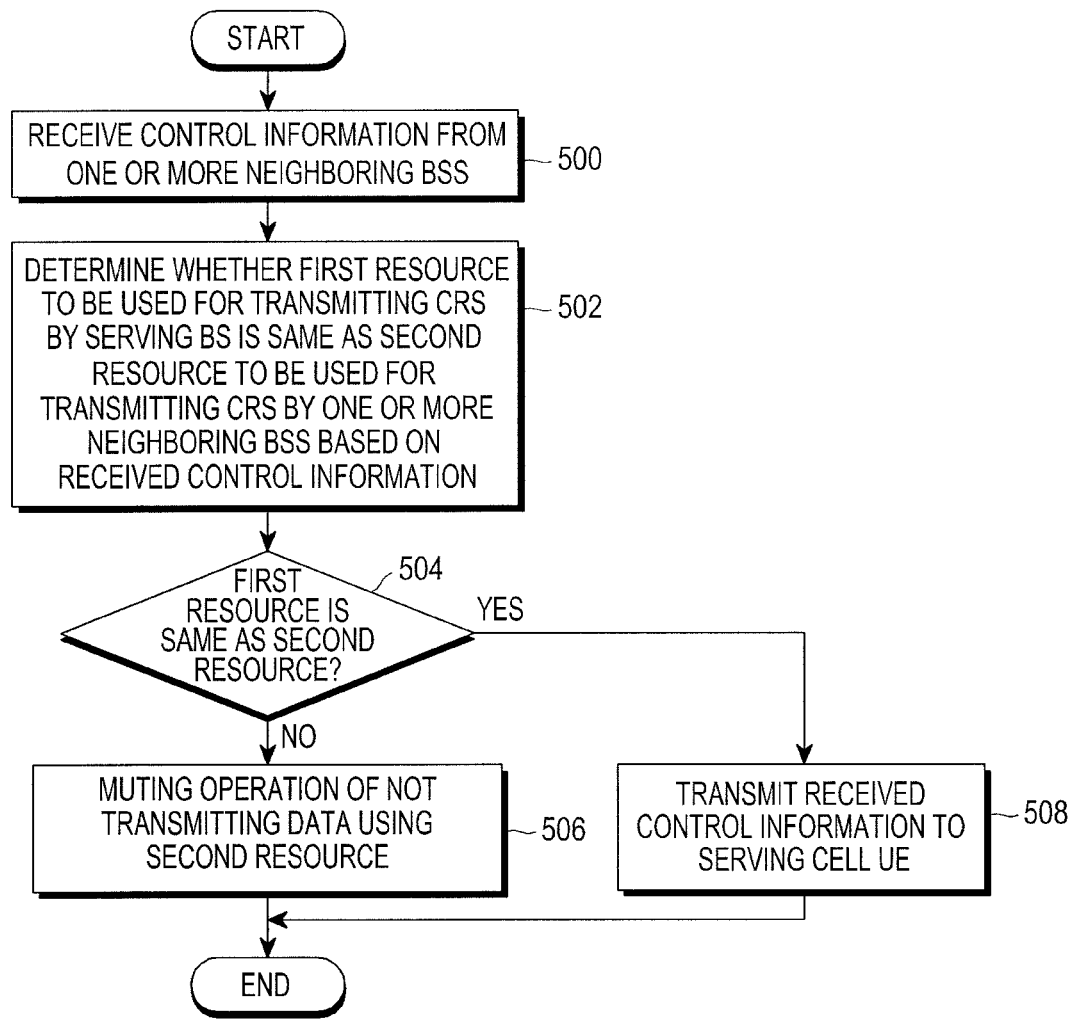
FIG. 5 is a flowchart illustrating a process of transmitting a CRS by a serving BS according to a second exemplary embodiment of the present invention.

FIG. 5 is a flowchart illustrating a process of transmitting a CRS by a serving BS according to a second exemplary embodiment of the present invention.

Referring to FIG. 5, the serving BS receives control information from one or more neighboring BSs in step 500. The control information includes signal transmission information and resource allocation information on the one or more neighboring BSs. Further, the control information may be received in various methods, such as being received according to a request of the serving BS or being periodically received.

The serving BS determines whether a first resource to be used for transmitting the CRS by the serving BS is the same as a second resource to be used for transmitting the CRS by the one or more neighboring BSs based on the received control information in step 502.

When the serving BS determines that the first resource is the same as the second resource in step 504, the serving BS transmits the control information received from the one or more neighboring BSs to the serving cell UE such that the serving cell UE is able to perform a channel estimation by using an interference signal removal scheme in step 508. One example of the interference signal removal scheme includes a scheme in which the serving cell UE detects a signal received from the one or more neighboring BSs from the received signal using the control information and removes the detected signal from the received signal.

In the meantime, FIG. 5 illustrates the transmission of the control information received from the one or more neighboring BSs to the serving cell UE when the first resource is the same as the second resource. However, the control information received from the one or more neighboring BSs may be periodically transmitted or transmitted to the serving cell UE according to a request of the serving cell UE, as well as when the first resource is the same as the second resource.

When the serving BS determines that the first resource is not the same as the second resource in step 504, the serving BS performs a muting operation of not transmitting data using the second resource in step 506. The muting operation includes an operation of ignoring a signal to be transmitted to a corresponding position and not transmitting the signal. Alternatively, the muting operation may include not assigning transmission data to resources corresponding to resources in which one or more neighboring BSs transmit the CRS. Accordingly, when the serving BS performs the muting operation, the serving BS does not transmit the data during the transmission of the CRS by the one or more neighboring BSs, interference according to the data transmission by the serving BS is not generated in cells of the one or more neighboring BSs during the transmission of the CRS.

In the meantime, according to the present exemplary embodiment of the present invention, a power compensation method may be used for preventing an increase of a code rate due to a decrease in the number of REs used for the data transmission (i.e., the number of REs is decreased by the number of REs used for the transmission of the CRS by the neighboring cell), compared to existing data transmission. The power compensation method includes a method of securing the signal reception performance of the UE by allocating power allocated to an RE, which is not available for the data transmission according to the transmission of the CRS by the neighboring cell, to the remaining REs used for the data transmission.

Hereinafter, a method of transmitting a signal by using the power compensation method by the serving BS will be described with reference to FIGS. 6 and 7.

Figure 6:
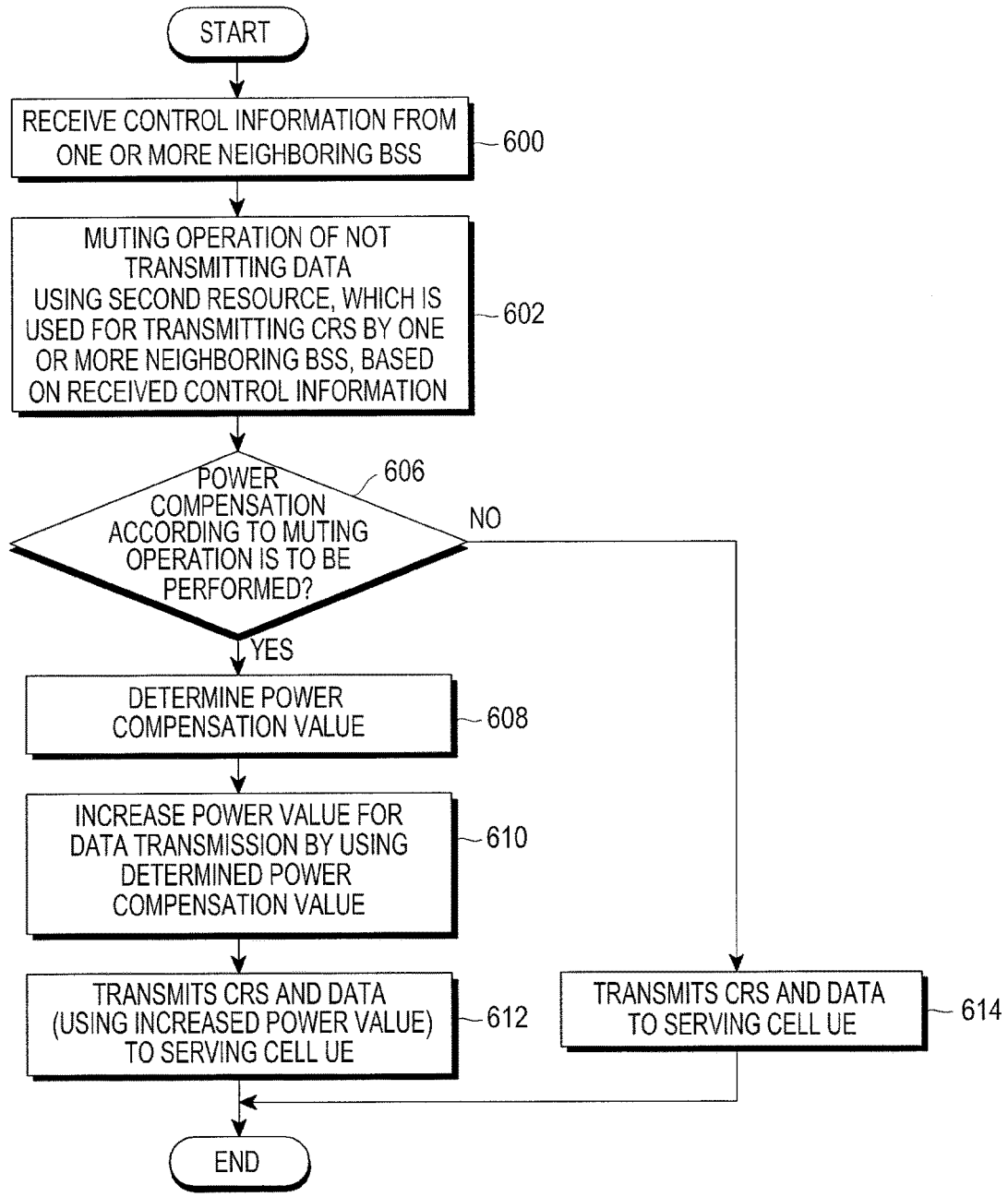
FIG. 6 is a flowchart illustrating a process of transmitting a CRS by a serving BS according to a third exemplary embodiment of the present invention.

FIG. 6 is a flowchart illustrating a process of transmitting a CRS by a serving BS according to a third exemplary embodiment of the present invention.

Referring to FIG. 6, the serving BS receives control information from one or more neighboring BSs in step 600. The control information includes signal transmission information and resource allocation information on the one or more neighboring BSs. Further, the control information may be received in various methods, such as being received according to a request made by the serving BS or being periodically received.

The serving BS performs a muting operation of not transmitting data using a second resource, which is used for transmitting the CRS by the one or more neighboring BSs, based on the received control information in step 602. The muting operation includes an operation of ignoring a signal to be transmitted to a corresponding position and not transmitting the signal. Alternatively, the muting operation may include not assigning transmission data to resources corresponding to resources in which one or more neighboring BSs transmit the CRS. When the serving BS performs the muting operation, the serving BS does not transmit the data during the transmission of the CRS by the one or more neighboring BSs, so that interference according to the data transmission by the serving BS is not generated in cells of the one or more neighboring BSs during the transmission of the CRS.

In the meantime, although it is not illustrated in FIG. 6, after receiving the control information, the serving BS may determine whether a first resource to be used for transmitting the CRS by the serving BS is the same as the second resource based on the received control information. That is, when the serving BS determines that the first resource is the same as the second resource, the serving BS may transmit the control information received from the one or more neighboring BSs to the serving cell UE such that the serving cell UE is able to perform a channel estimation by using an interference signal removal scheme. Further, when the serving BS determines that the first resource is not the same as the second resource, the serving BS may perform the muting operation.

The serving BS determines whether power compensation is to be performed according to the muting operation in step 606. When the serving BS is not to perform the power compensation, the serving BS transmits the CRS and the data to the serving cell UE by using a predetermined power value in step 614.

Further, when the serving BS is to perform the power compensation, the serving BS determines a power compensation value used for the data transmission in step 608. For example, when the serving BS uses the remaining resources, except for the second resource, used for the data transmission, the serving BS determines a power compensation value such that an amount of power corresponding to the determined power compensation value may be additionally used for the data transmission using the second resource. In this case, the power compensation value may be used as a boosting value for increasing a power value (this indicates a value for controlling the power value of all reception signals because it may be said that the power value is boosted one-fold even in a case where the power value is not increased) and may be determined considering a performance of the serving cell UE and a channel condition.

When the power compensation value is determined as described above, the serving BS increases the power value for the data transmission by using the determined power compensation value in step 610, and transmits the CRS and the data of the serving cell to the serving cell UE in step 612. In this case, the data is transmitted using the increased power value.

In the meantime, when the power compensation value is determined, the serving BS transmits information on the determined power compensation value to the serving cell UE in advance, so that the serving cell UE is able to improve the signal reception performance based on the received power compensation value.

Figure 7:
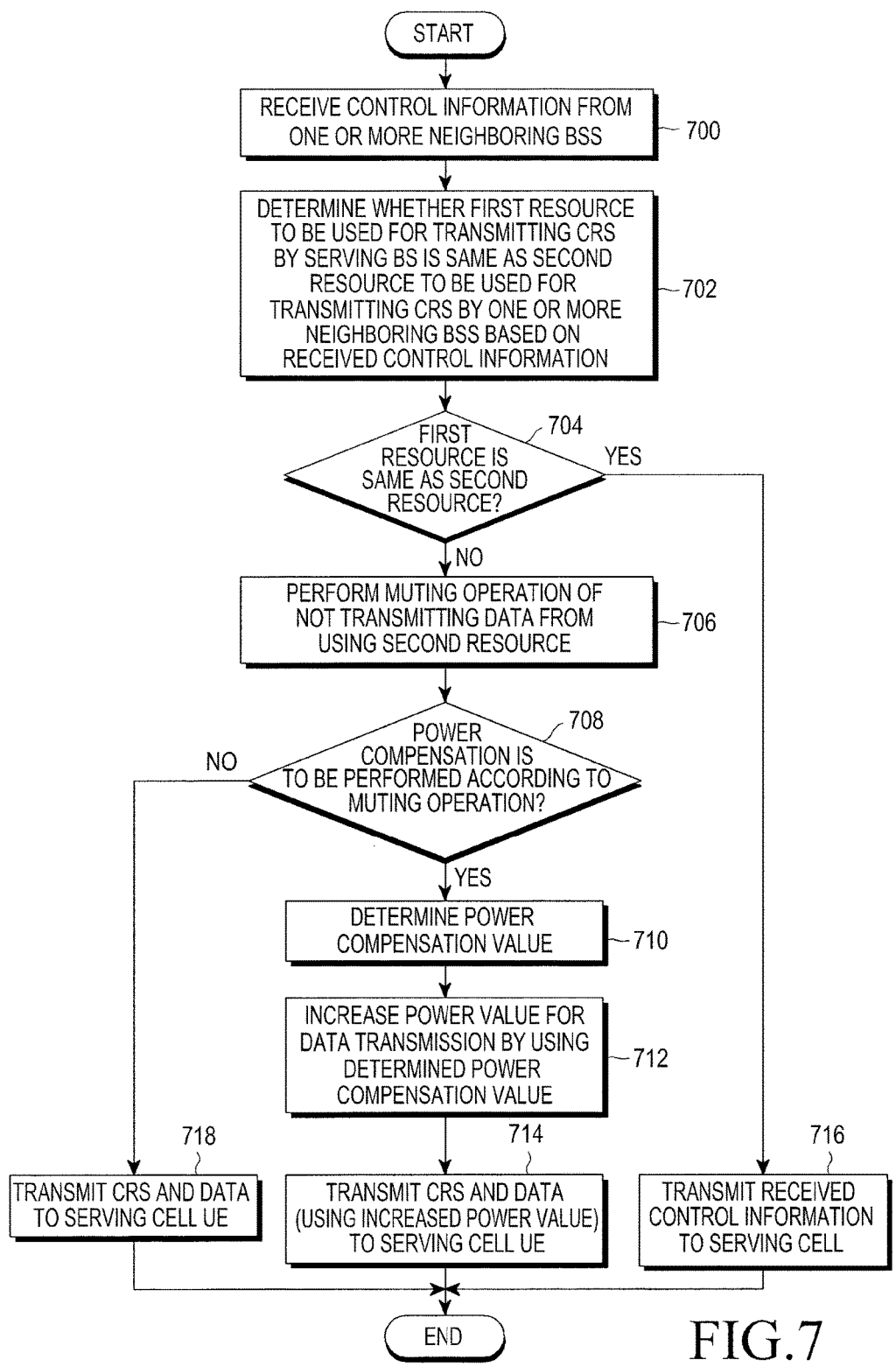
FIG. 7 is a flowchart illustrating a process of transmitting a CRS by a serving BS according to a fourth exemplary embodiment of the present invention.

FIG. 7 is a flowchart illustrating a process of transmitting a CRS by a serving BS according to a fourth exemplary embodiment of the present invention.

Referring to FIG. 7, the serving BS receives control information from one or more neighboring BSs in step 700. The control information includes signal transmission information and resource allocation information on the one or more neighboring BSs. Further, the control information may be received in various methods, such as being received according to a request of the serving BS or being periodically received.

The serving BS determines whether a first resource to be used for transmitting the CRS by the serving BS is the same as a second resource to be used for transmitting the CRS by the one or more neighboring BSs based on the received control information in step 702.

When the serving BS determines that the first resource is the same as the second resource in step 704, the serving BS transmits the control information received from the one or more neighboring BSs to the serving cell UE such that the serving cell UE is able to perform a channel estimation by using an interference signal removal scheme in step 716. One example of the interference signal removal scheme includes a scheme in which the serving cell UE detects a signal received from the one or more neighboring BSs from the received signal using the control information and removes the detected signal from the received signal.

In the meantime, FIG. 7 illustrates the transmission of the control information received from the one or more neighboring BSs to the serving cell UE when the first resource is the same as the second resource. However, the control information received from the one or more neighboring BSs may be periodically transmitted or transmitted to the serving cell UE according to a request of the serving cell UE, as well as when the first resource is the same as the second resource.

When the serving BS determines that the first resource is not the same as the second resource in step 704, the serving BS performs a muting operation of not transmitting data using the second resource in step 706. The muting operation includes an operation of ignoring a signal to be transmitted to a corresponding position and not transmitting the signal. Alternatively, the muting operation may include not assigning transmission data to resources corresponding to resources in which one or more neighboring BSs transmit the CRS.

Accordingly, when the serving BS performs the muting operation, the serving BS does not transmit the data during the transmission of the CRS by the one or more neighboring BSs, so that interference according to the data transmission by the serving BS is not generated in cells of the one or more neighboring BSs during the transmission of the CRS.

In the meantime, FIG. 7 illustrates that the muting operation is performed according to whether the first resource is the same as the second resource. However, the muting operation may be performed based on the received control information without the determination on whether the first resource is the same as the second resource as a matter of course.

The serving BS determines whether to perform power compensation according to the muting operation in step 708. When the serving BS is not to perform the power compensation, the serving BS transmits the CRS and the data to the serving cell UE by using a predetermined power value in step 718.

Further, when the serving BS is to perform the power compensation, the serving BS determines a power compensation value used for the data transmission in step 710. For example, when the serving BS uses the remaining resources, except for the second resource, used for the data transmission, the serving BS determines a power compensation value such that determined power may be additionally used for the data transmission using the second resource. In this case, the power compensation value may be used as a boosting value for increasing a power value (this indicates a value for controlling the power value of all reception signals because it may be said that the power value is boosted one-fold even in a case where the power value is not increased), and may be determined considering a performance of the serving cell UE and a channel condition.

When the power compensation value is determined as described above, the serving BS increases the power value for the data transmission by using the determined power compensation value in step 712, and transmits the CRS and the data of the serving cell to the serving cell UE in step 714. In this case, the data is transmitted using the increased power value.

In the meantime, when the power compensation value is determined, the serving BS transmits information on the determined power compensation value to the serving cell UE in advance, so that the serving cell UE is able to improve the signal reception performance based on the received power compensation value.

Figure 8:
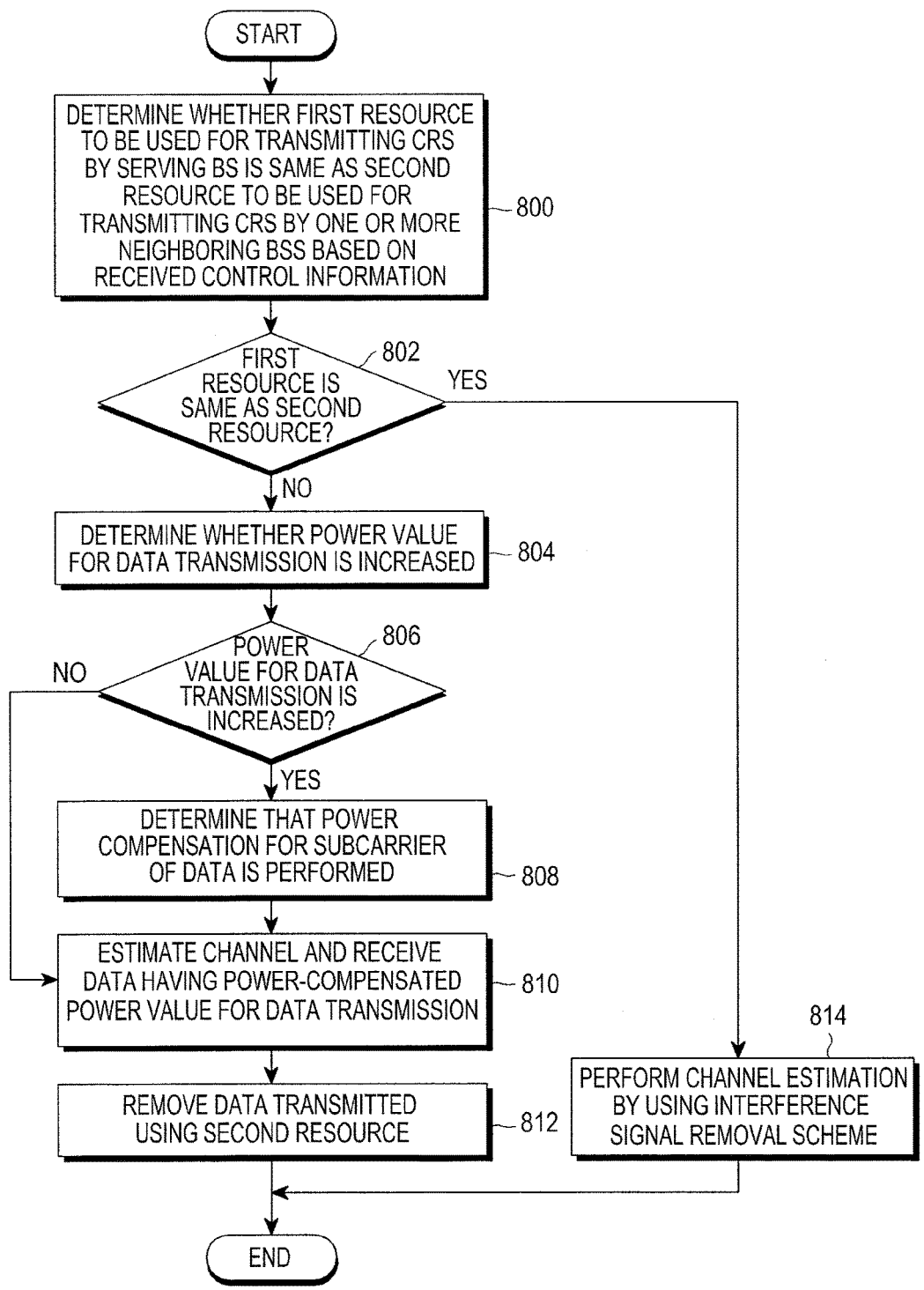
FIG. 8 is a flowchart illustrating a process of receiving a CRS by a User Equipment (UE) according to an exemplary embodiment of the present invention.

FIG. 8 is a flowchart illustrating a process of receiving a CRS by a UE according to an exemplary embodiment of the present invention.

Referring to FIG. 8, the UE receives control information on one or more neighboring BSs from a serving BS, together with control information on the serving BS.

The UE determines whether a first resource to be used for transmitting the CRS by the serving BS is the same as a second resource to be used for transmitting the CRS by the one or more neighboring BSs based on the received control information in step 800.

When the UE determines that the first resource is the same as the second resource in step 802, the UE performs a channel estimation based on the CRS by using an interference signal removal scheme in step 814.

When the UE determines that the first resource is not the same as the second resource in step 802, the UE estimates a power value for data transmission and determines whether the power value for the data transmission is increased in step 804. Here, the UE may determine whether the power value for the data transmission is increased by comparing a preset power value for the data transmission with the estimated power value for the data transmission.

For another example, the UE may determine whether the power value for the data transmission is increased based on information on a power compensation value received from the serving BS. In this case, the information on the power compensation value may be periodically received, received during a preset time interval, or received according to a request of the UE.

When the UE determines that the power value for the data transmission is increased in step 806, the UE determines that the power compensation for a subcarrier of the data is performed in step 808. Then, the UE estimates a channel by receiving the CRS and receives data having a power-compensated power value for the data transmission in step 810.

When the UE determines that the power value for the data transmission is not increased in step 806, the UE estimates a channel by receiving the CRS and receives data having the predetermined power value for the data transmission in step 810.

The UE removes (ignores) the signal transmitted using the second resource (e.g., processes a value of a reception signal as "0") in step 812. Since the second resource is used for the transmission of the CRS by the one or more neighboring BSs, the UE determines that the data is not transmitted using the second resource from the serving BS. Accordingly, when there is a signal transmitted using the second resource, the UE performs the aforementioned operation in order to ignore the corresponding signal.

Here, since the UE decodes the data received from the one or more neighboring BSs, as well as the data received from the serving BS, when the data is transmitted using the second resource from the one or more neighboring BSs, the UE removes the corresponding data.

Next, an internal construction of the BS and the UE according to exemplary embodiments of the present invention will be described with reference to FIGS. 9 and 10.

Figure 9:
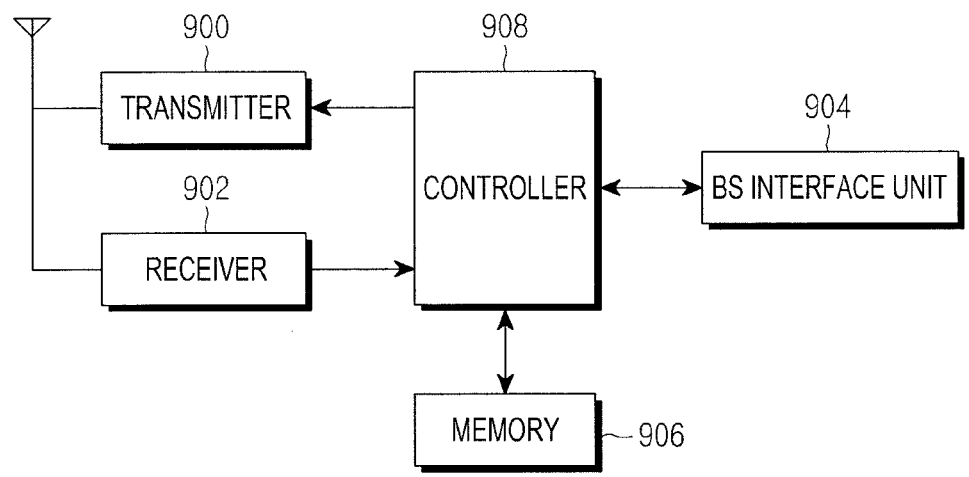
FIG. 9 is a block diagram illustrating a BS according to an exemplary embodiment of the present invention.

FIG. 9 is a block diagram illustrating a BS according to an exemplary embodiment of the present invention.

Referring to FIG. 9, the BS includes a transmitter 900, a receiver 902, a BS interface unit 904, a memory 906, and a controller 908.

The transmitter 900 and the receiver 902 are elements used for performing communication with a serving cell UE. That is, the transmitter 900 transmits a signal, such as a CRS, and data to the serving cell UE, and the receiver 902 receives a signal and data from the serving cell UE. Although it is not illustrated in FIG. 9, the transmitter 900 may include an encoder and a modulator for encoding and modulating a transmission signal.

The BS interface unit 904 performs communication with one or more neighboring BSs. More particularly, the BS interface unit 904 exchanges control information with the one or more neighboring BSs. The control information may be periodically exchanged or exchanged at a specific time.

The memory 906 stores all information and data generated during the operation of the BS. Especially, the memory 906 stores the control information received from the one or more neighboring BSs.

The controller 908 determines the operation of the BS by controlling the transmitter 900, the receiver 902, the BS interface unit 904, and the memory 906. Especially, the controller 908 controls the aforementioned elements such that the CRS transmission methods according to the first to fourth exemplary embodiments of the present invention illustrated in FIGS. 4 to 7 are performed. That is, the controller 908 may control the elements such that the muting operation illustrated in FIGS. 4 and 5 is performed, and such that the additional power compensation operation according to the muting operation illustrated in FIGS. 6 and 7 is performed.

For example, the controller 908 may perform the following operation. When the controller 908 receives the control information from the one or more neighboring BSs, the controller 908 determines whether a first resource to be used for transmitting the CRS by the serving BS is the same as a second resource to be used for transmitting the CRS by the one or more neighboring BSs based on the received control information.

When the controller 908 determines that the first resource is the same as the second resource, the controller 908 transmits the control information received from the one or more neighboring BSs to the serving cell UE such that the serving cell UE is able to perform a channel estimation by using an interference signal removal scheme.

When the controller 908 determines that the first resource is not the same as the second resource, the controller 908 performs a muting operation of not transmitting data using the second resource. Next, the controller 908 determines whether to perform power compensation according to the muting operation. When the controller 908 does not perform the power compensation, the controller 908 transmits the CRS and the data to the serving cell UE by using a predetermined power value.

Further, when the controller 908 performs the power compensation, the controller 908 determines a power compensation value such that power determined for the data transmission using the second resource may be additionally used when the controller 908 uses the remaining resources, except for the second resource, used for the data transmission.

When the power compensation value is determined, the controller 908 increases the power value for the data transmission by using the determined power compensation value, and transmits the CRS and the data to the serving cell UE.

Figure 10:
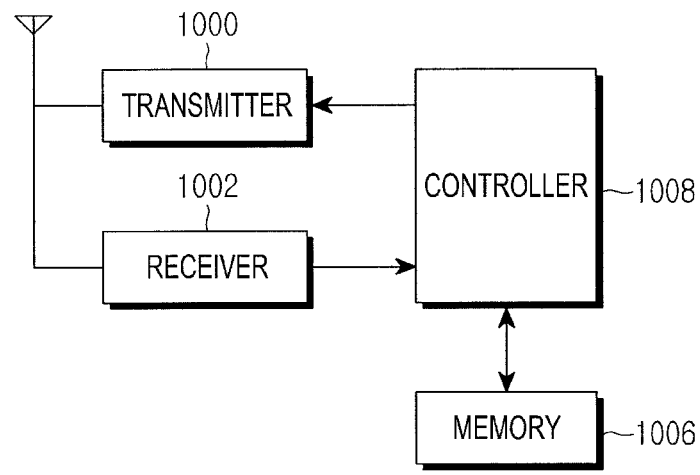
FIG. 10 is a block diagram illustrating a UE according to an exemplary embodiment of the present invention.

FIG. 10 is a block diagram illustrating a UE according to an exemplary embodiment of the present invention.

Referring to FIG. 10, the UE includes a transmitter 1000, a receive 1002, a memory 1006, and a controller 1008.

The transmitter 1000 and the receiver 1002 are elements for wireless communication of the UE. The transmitter 1000 transmits a signal and data to a serving BS, and the receiver 1002 receives a signal, such as a CRS and data from the serving BS and may receive a signal of a neighboring BS as an interference signal.

Further, although it is not illustrated in FIG. 10, the receiver 1002 may include a demodulator and a decoder for demodulating and decoding a reception signal.

The memory 1006 stores all information and data generated during the operation of the UE.

The controller 1008 determines the operation of the UE by controlling the transmitter 1000, the receiver 1002, and the memory 1006. Further, although it is not illustrated in FIG. 10, the controller 1008 may include a channel estimator for performing a channel estimation based on the CRS.

The controller 1008 controls the aforementioned elements such that the CRS reception method according to the exemplary embodiment of the present invention illustrated in FIG. 8 is performed. More particularly, the controller 1008 receives control information on one or more neighboring BSs from a serving BS, together with control information on the serving BS. The controller 1008 determines whether a first resource to be used for transmitting the CRS by the serving BS is the same as a second resource to be used for transmitting the CRS by the one or more neighboring BSs based on the received control information.

When the controller 1008 determines that the first resource is the same as the second resource, the controller 1008 performs a channel estimation based on the CRS by using an interference signal removal scheme. When the controller 1008 determines that the first resource is not the same as the second resource, the controller 1008 estimates a power value for data transmission and determines whether the power value for the data transmission is increased. Otherwise, the controller 1008 may determine whether the power value for the data transmission is increased based on information on a power compensation value received from the serving BS.

When the controller 1008 determines that the power value for the data transmission is increased, the controller 1008 determines that the power compensation for a subcarrier of the data is performed. Then, the controller 1008 estimates a channel by receiving the CRS and receives data having a power-compensated power value for the data transmission.

The controller 1008 removes the corresponding signal (e.g., processes a value of a reception signal as "0") when there is the signal transmitted using the second resource. The controller 1008 determines that the data is not transmitted using the second resource from the serving BS based on the fact that the second resource used for the transmission of the CRS by the one or more neighboring BSs is not used. Accordingly, the controller 1008 performs the aforementioned operation in order to ignore the corresponding signal when there is a signal transmitted using the second resource.

Accordingly, the exemplary embodiments of the present invention have an effect of preventing the generation of the interference according to the transmission of the CRS by transmitting the CRS using difference resources in the respective cells.

Further, according to the exemplary embodiments of present invention, when the data of the first cell and the CRS of the second cell which is the neighboring cell of the first cell uses the same resources, the data of the serving cell is not transmitted, so that the UE of the second cell may perform the channel estimation without the interference. Here, the first cell additionally uses power which is not used due to non-transmission of the data as the power for transmitting the remaining data, so that the exemplary embodiments of present invention can improve the degraded performance of the UE according to the non-transmission of the data in the first cell and improve the reception signal decoding performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data by a base station (BS) in a wireless communication system, the method comprising:
   receiving, by the BS, control information representing a first resource allocated for transmission of a reference signal (RS) from a neighboring BS transmitting the RS;
   allocating, by the BS, a second resource for transmission of the data, based on the received control information, the second resource being allocated among available resources other than the first resource; and
   transmitting, by the BS, the data to a user equipment (UE) using the second resource during transmission of the RS.

2. The method of claim 1, wherein the second resource is allocated among available resources other than the first resource.

3. The method of claim 2, wherein the transmitting of the data using the second resource comprises:
   determining whether power compensation is to be performed;
   when the power compensation is to be performed, determining a power compensation value, and transmitting the data using the second resource, other than the first resource, to the UE at an increased power corresponding to the determined power compensation value; and
   when the power compensation is not to be performed, transmitting the data using the second resource, other than the first resource, to the UE without increasing power based on the power compensation value.

4. The method of claim 3, wherein the power compensation value is determined based on a performance of the UE and a channel condition.

5. The method of claim 3, wherein, when the power compensation is to be performed, the determined power compensation value is transmitted to the UE before the data is transmitted.

6. The method of claim 1, wherein the transmitting of the data comprises:
   determining whether a third resource for transmission of a RS by the BS is the same as the first resource for transmission of the RS by the neighboring B S;
   when the third resource is not the same as the first resource, transmitting the data using the second resource, other than the first resource, to the UE; and when the third resource is the same as the first resource, transmitting the received control information to the UE.

7. The method of claim 6, wherein the transmitting of the data comprises:
determining whether power compensation is to be performed;
when the power compensation is to be performed, determining a power compensation value, and transmitting the data using the second resource, other than the first resource, to the UE at an increased power corresponding to the determined power compensation value; and
when the power compensation is not to be performed, transmitting the data using the second resource, other than the first resource, to the UE without increasing power based on the power compensation value.

8. The method of claim 7, wherein the power compensation value is determined based on a performance of the UE and a channel condition.

9. The method of claim 7, wherein, when the power compensation is to be performed, the determined power compensation value is transmitted to the UE before the data is transmitted to the UE.

10. A base station (BS) in a wireless communication system, the BS comprising:
a BS interface configured to communicate with a neighboring BS;
a transmitter configured to: transmit data to a user equipment (UE); and
a controller configured to control the BS interface and the transmitter,
receive control information representing a first resource allocated for transmission of a reference signal (RS) from a neighboring BS transmitting the RS,
allocate a second resource for transmission of the data, based on the received control information, the second resource being allocated among available resources other than the first resource, and
transmit the data to the UE using the second resource during transmission of the RS.

11. The BS of claim 10, wherein, the second resource is allocated among available resources other than the first resource.

12. The BS of claim 11, wherein the controller is further configured to:
determine whether power compensation is to be performed,
when the power compensation is to be performed, determine a power compensation value, and control transmitting the data using the second resource, other than the first resource, to the UE at an increased power corresponding to the determined power compensation value; and
when the power compensation is not to be performed, control transmitting the data using the second resource, other than the first resource, to the UE without increasing power based on the power compensation value.

13. The BS of claim 12, wherein the controller is further configured to determine the power compensation value based on a performance of the UE and a channel condition.

14. The BS of claim 12, wherein, when the power compensation is to be performed, the controller is further configured to control transmitting the determined power compensation value to the UE before the data is transmitted to the UE.

15. The BS of claim 10, wherein the controller is further configured to:
determine whether a third resource for transmission of a RS by the BS is the same as the first resource for transmission of the RS by the neighboring BS;
when the third resource is not the same as the first resource, control transmitting the data using the second resource, other than the first resource, to the UE; and
when the third resource is the same as the first resource, control transmitting the received control information to the UE.

16. The BS of claim 15, wherein the controller is further configured to:
determine whether power compensation is to be performed,
when the power compensation is to be performed, determine a power compensation value, and control transmitting the data using the second resource, other than the first resource, to the UE at an increased power corresponding to the determined power compensation value; and
when the power compensation is not to be performed, control transmitting the data using the second resource, other than the first resource, to the UE without increasing power based on the power compensation value.

17. The BS of claim 16, wherein the controller is further configured to determine power compensation value based on a performance of the UE and a channel condition.

18. The BS of claim 16, wherein, when the power compensation is to be performed, the controller is further configured to control transmitting the determined power compensation value to the UE before the data is transmitted to the UE.

* * * * *